M. M. BREWEN.
CLUTCH PEDAL LOCK.
APPLICATION FILED NOV. 22, 1917.
1,277,184.
Patented Aug. 27, 1918.
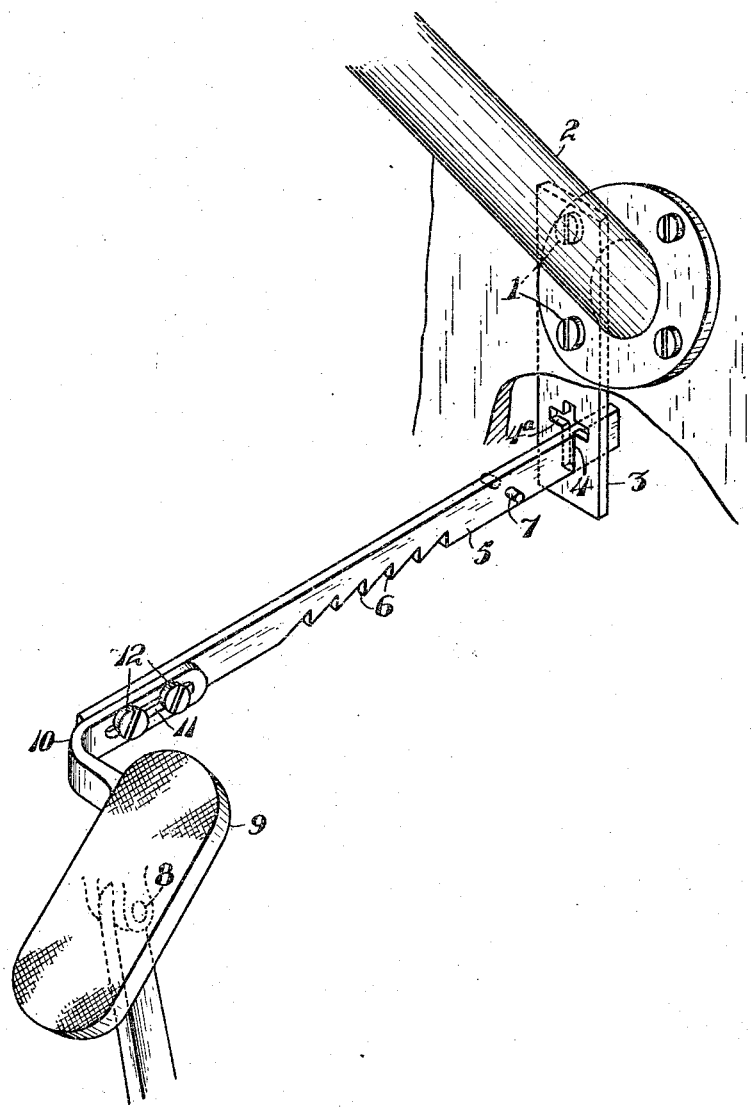
WITNESS:
F. C. Fliedner
J. H. Herring
INVENTOR.
Marvin M. Brewen
BY
Strong & Townsend
ATTORNEYS.

UNITED STATES PATENT OFFICE.

MARVIN M. BREWEN, OF MARTINEZ, CALIFORNIA.

CLUTCH-PEDAL LOCK.

1,277,184.   Specification of Letters Patent.   Patented Aug. 27, 1918.

Application filed November 22, 1917. Serial No. 203,350.

*To all whom it may concern:*

Be it known that I, MARVIN M. BREWEN, a citizen of the United States, residing at Martinez, in the county of Contra Costa and State of California, have invented new and useful Improvements in Clutch-Pedal Locks, of which the following is a specification.

This invention relates to a pedal lock to be used in connection with the speed changing clutch of a planetary transmission for motor vehicles and the like, and is more particularly designed for use on the Ford type of automobiles.

One of the objects of the present invention is to provide means operable in conjunction with the clutch pedal and independently of the emergency brake for locking the clutch in low gear or in neutral position. Another object of the invention is to provide a simple, cheaply manufactured device of the character described, which may be readily applied in a motor vehicle of the type referred to at relatively small cost. Further objects will hereinafter appear.

The invention consists of the parts and the construction and arrangement of parts as hereinafter more fully described and claimed, having reference to the accompanying drawing, in which—

The figure is a perspective view, showing the application of the invention.

In automobiles, such as the Ford, having a planetary transmission gear it is necessary to depress the clutch pedal in a forward direction to engage the low speed gear. When the pedal is pressed half way forward the gears are in neutral (*i. e.* disconnected from the driving mechanism of the rear wheels), and, with a hand lever thrown forward, the releasing of this pedal engages the high speed clutch.

The planetary transmission gear being so well known requires no description. It is sufficient to say that a strong spring in the transmission gear pulls backward on the pedal causing the engagement of the high speed clutch.

The low gear is used when the car is first started in motion, or when for any reason the load is so heavy that the use of the low gear is necessary; for instance, when going up a hill. In order to keep the low gear in engagement it is necessary to press forward on the clutch pedal and to keep the same in the extreme forward position in opposition to the action of the spring in the transmission gear previously referred to. Holding the foot on the pedal for any length of time, when traveling in hilly or mountainous country, is very tiring to the driver. Moreover, the low gear transmission band has a tendency to slip and to get hot owing to the occasional release of the clutch pedal.

The purpose of the present invention is to overcome this difficulty by providing means for positively locking the clutch pedal in the extreme forward position when the low gear drive is required. This is accomplished in the following manner: Secured, by means of screws 1 which hold the steering post 2 in place, is a plate 3, which is provided with a cross-shaped slot 4. Slidably mounted in the slot is a rack bar 5 provided with a series of teeth 6 and a pin 7. Pivotally mounted, as at 8, on the upper end of the clutch pedal is a foot plate 9, and formed on said foot plate is an offset extension 10 which is slotted, as at 11, to permit the rack bar 5 to be adjustably secured thereto by means of screws 12.

To apply the foot plate 9 and the mechanism here described it is necessary to cut off the fixed foot plate with which all Ford clutch pedals are provided; that is, the foot plate is cut off from the pedal proper and this is then drilled to receive the pivot pin 8 which secures the new foot plate 9 in position. The nuts on the screws 1 are then removed to permit the slotted plate 3 to be secured in position and a perfect adjustment of the rack bar with relation to the foot plate 9 is permitted by slotting the offset extension 10 and the rack bar and securing the same together by means of the screws 12.

A Ford automobile thus equipped is operated in the usual manner. When starting it is only necessary to place the foot on the plate 9 and rock it until the pin 7 registers with the cross slot 4ᵃ in the plate 3. The pedal may then be depressed to its extreme forward position where the low gear is engaged and if a long hill is at once encountered it can readily be seen that the pedal may be locked in this position by merely depressing the foot plate 9 about the pivot 8 until the teeth 6 engage the lower end of the main slot 4 formed in plate 3. The clutch pedal thus locked cannot be released until the foot plate is again rocked to release the teeth with relation to the lower end of the slotted plate, thus preventing the low gear transmission band from slipping or getting hot owing to the occasional releasing of the clutch pedal when foot pressure is entirely relied on.

If it is desired to move the clutch pedal to neutral position, it is merely necessary to disengage the teeth and permit the pedal to return until the pin 7 engages the plate. This locks the clutch pedal in neutral position, something which is very desirable when coasting down long inclines or when shoving the automobile out of the garage. Again, if it is desired to throw the clutch pedal into the high gear, it is only necessary to disengage the rack bar with relation to the plate and permit the pedal to come back to the high gear position; the rearward movement of the pedal being transmitted by the spring in the transmission gear case, as previously described, while forward movement of the clutch pedal must necessarily be accomplished by foot pressure.

Another advantage of the present attachment is the fact that the driver does not have to feel for the neutral position when throwing the clutch pedal either out of low or high gear as the pin 7 will engage the forward side of the plate when the clutch pedal is thrown out of high gear and the rear side of the plate when it is thrown out of low gear, the clutch pedal being locked in neutral position when it engages the rear side of the plate, as previously described.

The mechanism as a whole is not only cheap to manufacture but may also be quickly and easily applied to any Ford car as it is only necessary to cut off the foot plate usually employed and apply the plate 9 and then to secure the slotted plate 3 to the post, as previously described, and as this can be accomplished in a comparatively short time the cost of installation is very small and can be accomplished by practically any one.

The materials and finish of the several parts of the device here shown may be such as the experience and judgment of the manufacturer dictate.

I wish it understood that various changes in form, proportions and minor details of construction may be resorted to within the scope of the appended claims and that I do not wish to limit myself to the specific design and construction here shown.

Having thus described my invention, what I claim and desire to secure by Letters Patent is—

1. The combination with the clutch pedal on a planetary transmission gear of an automobile, of a foot plate pivotally mounted on the clutch pedal, a rack bar attached to said foot plate, teeth formed on said rack bar, a stationary member with which said teeth are adapted to engage, said member comprising a slotted plate through which the rack bar passes, means for securing said plate to the steering post of the automobile, and a pin on the rack bar adapted to engage the slotted plate to lock the clutch pedal when in neutral position, said engagement taking place on the forward side of the plate when the clutch pedal is to be locked against movement in the neutral position and said pin also adapted to engage the opposite side of the plate when it is desired to move the pedal from direct drive to neutral position without locking the pedal.

2. The combination with the clutch pedal on a planetary transmission gear of an automobile, of a foot plate pivotally mounted on the pedal, a plate rigidly secured ahead of the pedal, said plate having a cross-shaped slot formed therein, a toothed rack bar secured to the pedal extending through the cross-shaped slot in the plate, and a pin secured in the rack bar adapted to permit the clutch pedal to be locked against movement when in neutral position.

3. The combination with the clutch pedal on a planetary transmission gear of an automobile and the steering post on the automobile, of a plate securel to the steering post, said plate having a cross-shaped slot formed therein, a foot plate pivotally mounted on the clutch pedal, a bar adjustably secured to the foot plate passing through the slot in the first named plate, teeth formed on the rack bar engageable with the bottom of the slotted portion adapted to lock the bar and pedal when the pedal has moved to low gear driving position, and a pin extending through the rack bar adapted to pass through the cross slots in the plate and also adapted to engage the plate to lock the clutch pedal when the gears are in neutral position.

4. The combination with the clutch pedal on a planetary transmission gear of an automobile and the steering post on the automobile, of a plate secured to the steering post, said plate having a cross-shaped slot formed therein, a foot plate pivotally mounted on the clutch pedal, a bar adjustably secured to the foot plate passing through the slot in the first named plate, teeth formed on the rack bar engageable with the bottom of the slotted portion adapted to lock the bar and pedal when the pedal has moved to low gear driving position, a pin extending through the rack bar adapted to pass through the cross slots in the plate and also adapted to engage the plate to lock the clutch pedal when the gears are in neutral position, a slotted extension on the foot plate, and means for securing and adjusting the position of the toothed bar endwise with relation to said slotted extension.

In testimony whereof I have hereunto set my hand in the presence of two subscribing witnesses.

MARVIN M. BREWEN.

Witnesses:
Geo. E. Barnett,
E. A. Majors.

Copies of this patent may be obtained for five cents each, by addressing the "Commissioner of Patents, Washington, D. C."